(12) United States Patent
Frierman

(10) Patent No.: US 10,358,039 B1
(45) Date of Patent: Jul. 23, 2019

(54) VEHICLE TURBINE SYSTEM

(71) Applicant: Edward Michael Frierman, Lakeland, FL (US)

(72) Inventor: Edward Michael Frierman, Lakeland, FL (US)

( * ) Notice: Subject to any disclaimer, the term of this patent is extended or adjusted under 35 U.S.C. 154(b) by 0 days.

(21) Appl. No.: 16/131,190

(22) Filed: Sep. 14, 2018

(51) Int. Cl.
*B60L 8/00* (2006.01)
*B60K 16/00* (2006.01)
*F03D 9/32* (2016.01)
*F03D 9/25* (2016.01)

(52) U.S. Cl.
CPC .............. *B60L 8/006* (2013.01); *B60K 16/00* (2013.01); *F03D 9/25* (2016.05); *F03D 9/32* (2016.05); *B60K 2016/006* (2013.01)

(58) Field of Classification Search
CPC ... B60L 8/006; B60K 16/00; B60K 2016/006; F03D 9/32; H02K 1/2793
See application file for complete search history.

(56) References Cited

U.S. PATENT DOCUMENTS

| | | | | |
|---|---|---|---|---|
| 3,876,925 A * | 4/1975 | Stoeckert | ............... | B60K 16/00 322/1 |
| 4,019,828 A * | 4/1977 | Bunzer | ..................... | B60L 8/00 416/55 |
| 4,051,402 A * | 9/1977 | Gruber | ................... | H02K 23/56 310/266 |
| 4,075,545 A * | 2/1978 | Haberer | ................... | B60K 1/04 322/35 |
| 4,132,282 A * | 1/1979 | Sparks | .................. | B60K 16/00 180/2.2 |
| 4,168,759 A * | 9/1979 | Hull | ....................... | B60K 16/00 180/2.2 |
| 4,179,007 A * | 12/1979 | Howe | ...................... | B60K 6/48 180/2.2 |
| 4,314,160 A * | 2/1982 | Boodman | .............. | B60K 16/00 290/55 |
| 5,141,173 A * | 8/1992 | Lay | ........................... | B60F 5/02 244/2 |
| 6,138,781 A * | 10/2000 | Hakala | ...................... | F03D 9/32 180/2.2 |
| 6,404,091 B1 * | 6/2002 | Nakamura | ............... | H02K 3/12 310/179 |
| 6,897,575 B1 * | 5/2005 | Yu | .......................... | B60K 16/00 290/44 |
| 7,387,182 B2 * | 6/2008 | Fleming | ................... | B60K 6/48 180/165 |
| 7,445,064 B2 * | 11/2008 | Kim | ....................... | B60K 16/00 180/2.2 |
| 7,641,005 B2 * | 1/2010 | Cong | ..................... | B60K 16/00 180/2.2 |
| 7,802,641 B2 * | 9/2010 | Friedmann | ............. | B60K 16/00 180/2.2 |
| 7,810,589 B2 * | 10/2010 | Frierman | ................ | B60L 8/006 180/2.2 |

(Continued)

FOREIGN PATENT DOCUMENTS

FR 3025144 B1 * 12/2017
WO WO-2013094808 A1 * 6/2013 ............. B60L 8/006

*Primary Examiner* — James A Shriver, II
*Assistant Examiner* — Steve Clemmons

(57) ABSTRACT

A vehicle has a plurality of turbines. Each turbine includes a housing with a spindle. Each spindle has a central axis and a rotor with outwardly extending blades. Each turbine also includes a stator positioned adjacent to an associated rotor.

7 Claims, 6 Drawing Sheets

(56) References Cited

U.S. PATENT DOCUMENTS

| | | | | |
|---|---|---|---|---|
| 7,997,371 B2* | 8/2011 | Khymych | ............... | B60K 16/00 180/165 |
| 8,220,570 B1* | 7/2012 | Knickerbocker | ...... | B60K 16/00 180/2.2 |
| 8,240,416 B2* | 8/2012 | Cong | ................. | F03D 9/32 180/165 |
| 9,428,061 B1* | 8/2016 | Ripley | ................. | B60L 8/006 |
| 10,160,330 B2* | 12/2018 | Kim | ................... | F03D 9/32 |
| 2002/0153178 A1* | 10/2002 | Limonius | ............... | B60L 8/00 180/2.2 |
| 2004/0040755 A1* | 3/2004 | Swindell | ............... | B60L 8/00 180/2.2 |
| 2005/0127769 A1* | 6/2005 | Minagawa | ........... | H02K 1/2793 310/156.32 |
| 2006/0278445 A1* | 12/2006 | Chang | ................. | B60L 8/006 180/2.2 |
| 2008/0179114 A1* | 7/2008 | Chen | ................... | B60K 16/00 180/2.2 |
| 2009/0072639 A1* | 3/2009 | Seneff | ................ | H02K 1/2793 310/43 |
| 2009/0273249 A1* | 11/2009 | Lamperth | ............ | B60K 7/0007 310/77 |
| 2011/0031043 A1* | 2/2011 | Armani | ................ | F03D 9/00 180/2.2 |
| 2011/0248666 A1* | 10/2011 | Lorenson | ............. | B60L 8/006 320/101 |
| 2017/0163112 A1* | 6/2017 | Tokoi | ................... | H02K 21/24 |
| 2017/0342964 A1* | 11/2017 | Cianflone | ............ | B60K 1/00 |

\* cited by examiner

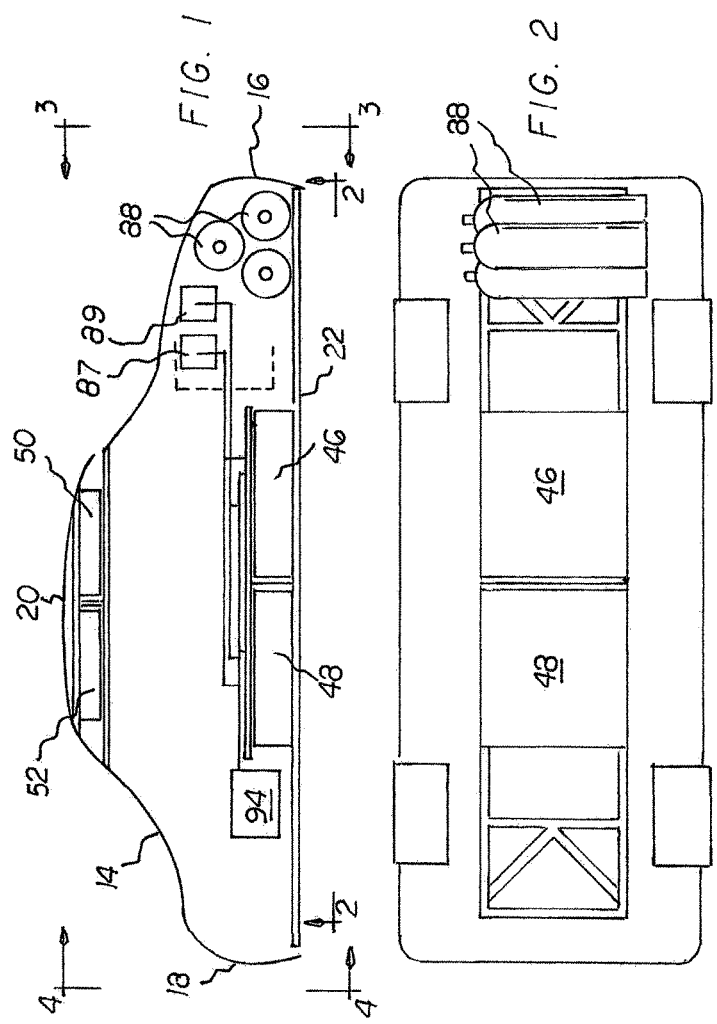

VEHICLE TURBINE SYSTEM

RELATED APPLICATION

This application is an improvement over my U.S. Pat. No. 7,810,589 issued Oct. 12, 2010. In the present invention, the batteries of U.S. Pat. No. 7,810,589 as a device to start the automobile are replaced by compressed air tanks. This reduces weight, acts as a safety device and used to provide power when the vehicle is not in motion. Improvements to the configuration and location of the generators provides increased power to the electric motor.

BACKGROUND OF THE INVENTION

Field of the Invention

The present invention relates to a turbine vehicle system and more particularly pertains to utilizing wind for rotating turbines in a vehicle when moving and for powering the vehicle in response to the rotating.

Description of the Prior Art

The use of turbines for use in vehicles of known designs and configurations is known in the prior art. More specifically, turbines for use in vehicles of known designs and configurations previously devised and utilized for the purpose of power vehicles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe turbine vehicle system that allows utilizing wind for rotating turbines in a vehicle when moving and for powering the vehicle in response to the rotating. The rotating for powering being done in a safe, energy efficient, economical, and ecological manner.

In this respect, the turbine vehicle system according to the present invention substantially departs from the conventional concepts and designs of the prior art, and in doing so provides an apparatus primarily developed for the purpose of utilizing wind for rotating turbines in a vehicle when moving and for powering the vehicle in response to the rotating. The rotating for powering being done in a safe, energy efficient, economical, and ecological manner.

Therefore, it can be appreciated that there exists a continuing need for a new and improved turbine vehicle system which can be used for utilizing wind for rotating turbines in a vehicle when moving and for powering the vehicle in response to the rotating. The rotating for powering being done in a safe, energy efficient, economical, and ecological manner. In this regard, the present invention substantially fulfills this need.

SUMMARY OF THE INVENTION

In view of the disadvantages inherent in the known types of vehicle motors now present in the prior art, the present invention provides an improved turbine vehicle system. As such, the general purpose of the present invention, which will be described subsequently in greater detail, is to provide a new and improved turbine vehicle system and method which has all the advantages of the prior art and none of the disadvantages.

To attain this, the present invention essentially comprises a vehicle having a plurality of turbines. Each turbine includes a housing with a spindle. Each spindle has a central axis and a rotor with outwardly extending blades. Each turbine also includes a stator positioned adjacent to an associated rotor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved turbine vehicle system which has all of the advantages of the prior art turbines for use in vehicles of known designs and configurations and none of the disadvantages.

It is another object of the present invention to provide a new and improved turbine vehicle system which may be easily and efficiently manufactured and marketed.

It is further object of the present invention to provide a new and improved turbine vehicle system which is of durable and reliable constructions.

An even further object of the present invention is to provide a new and improved turbine vehicle system which is susceptible of a low cost of manufacture with regard to both materials and labor, and which accordingly is then susceptible of low prices of sale to the consuming public, thereby making such turbine vehicle system economically available to the buying public.

Lastly, it is an object of the present invention to provide a new and improved turbine vehicle system for utilizing wind for rotating turbines in a vehicle when moving and for powering the vehicle in response to the rotating. The rotating for powering being done in a safe, energy efficient, economical, and ecological manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a turbine vehicle system, partly in cross section, constructed in accordance with the principles of the present invention.

FIG. 2 is a bottom elevational view taken along line 2-2 of FIG. 1.

The same reference numerals refer to the same parts throughout the various Figures.

DESCRIPTION OF THE PREFERRED EMBODIMENT

Figure 3:
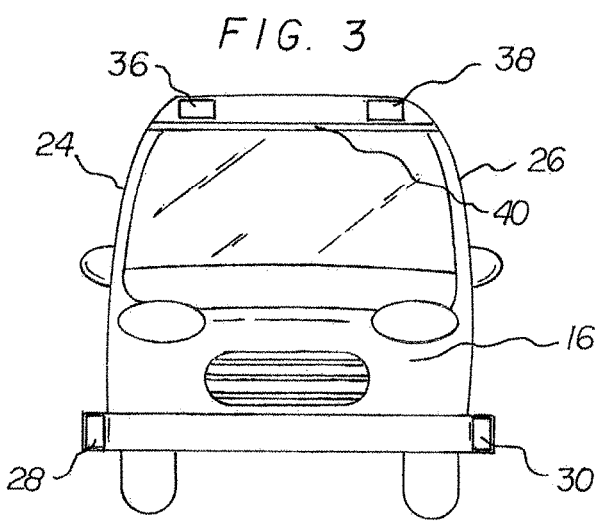
FIG. 3 is a front elevational view taken along line 3-3 of FIG. 1.
Figure 4:
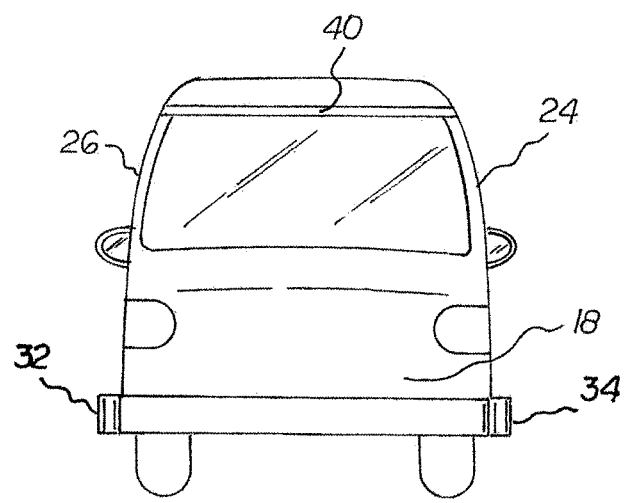
FIG. 4 is a rear elevational view taken along line 4-4 of FIG. 1.
Figure 5:
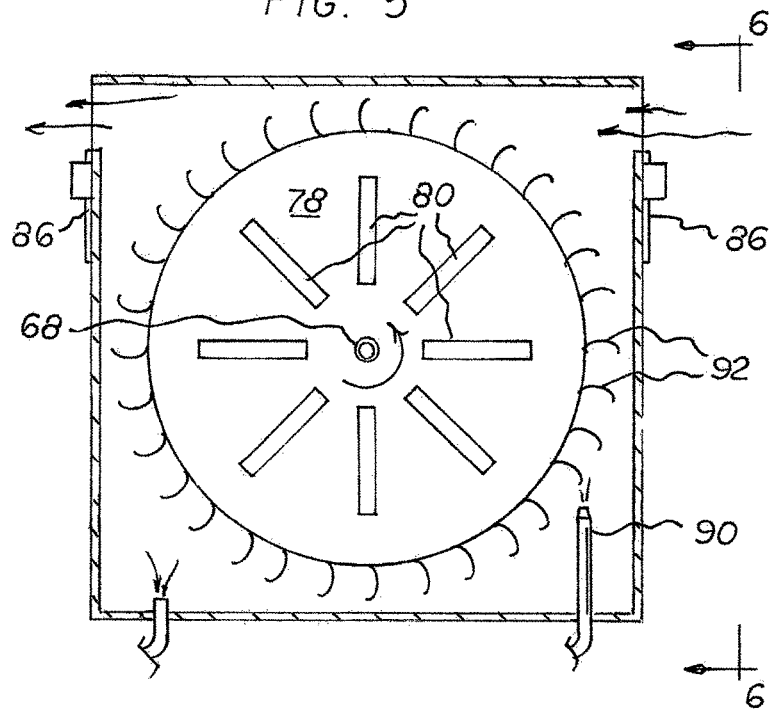
FIG. 5 is a plan view taken of one of the two lower turbines.
Figure 6:
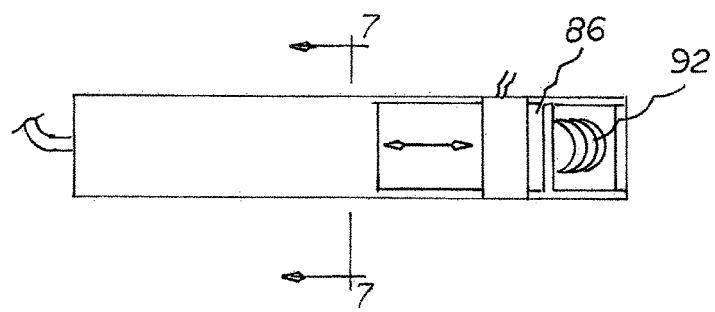
FIG. 6 is a side elevational view taken along line 6-6 of FIG. 5.
Figure 7:
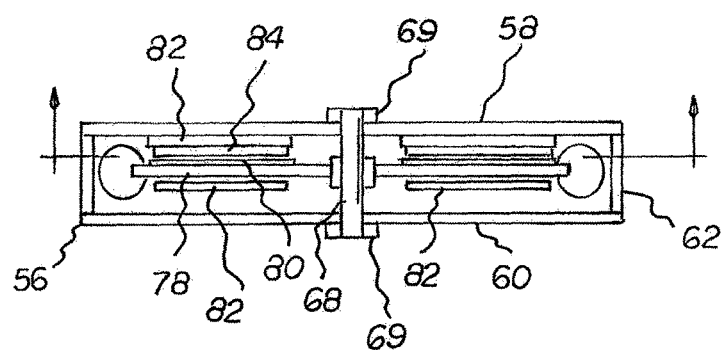
FIG. 7 is a cross sectional view taken along line 7-7 of FIG. 6.
Figure 8:
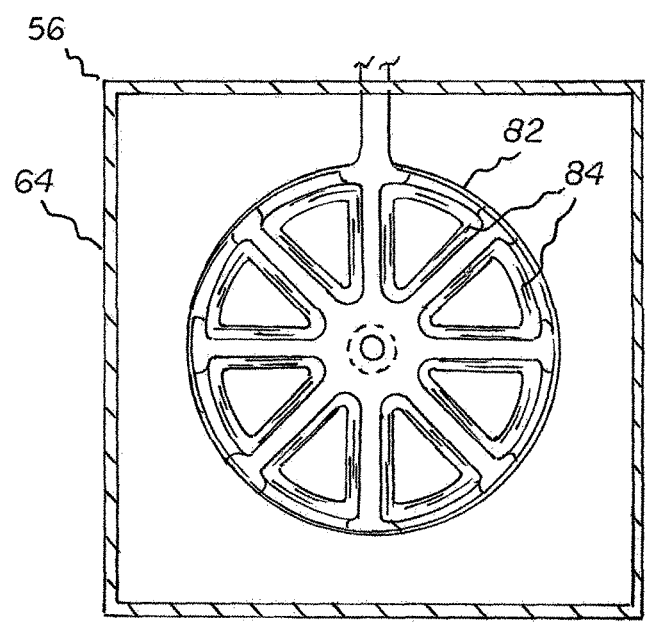
FIG. 8 is a cross sectional view taken along line 8-8 of FIG. 7.
Figure 9:
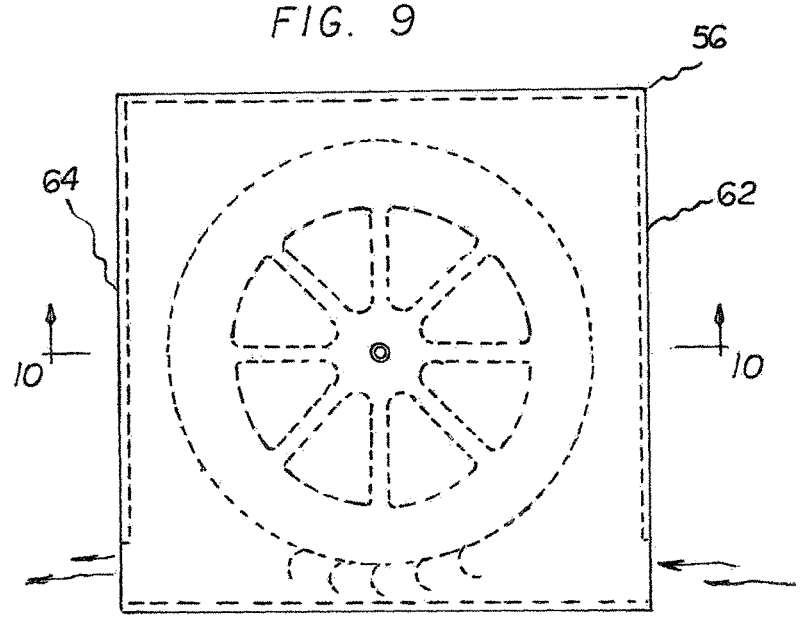
FIG. 9 is a plan view taken of one of the two upper turbines.
Figure 10:
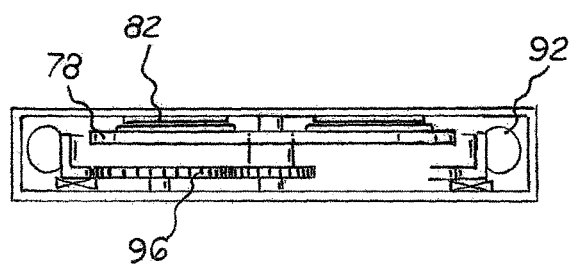
FIG. 10 is a side elevational view taken along line 10-10 of FIG. 5.
Figure 11:
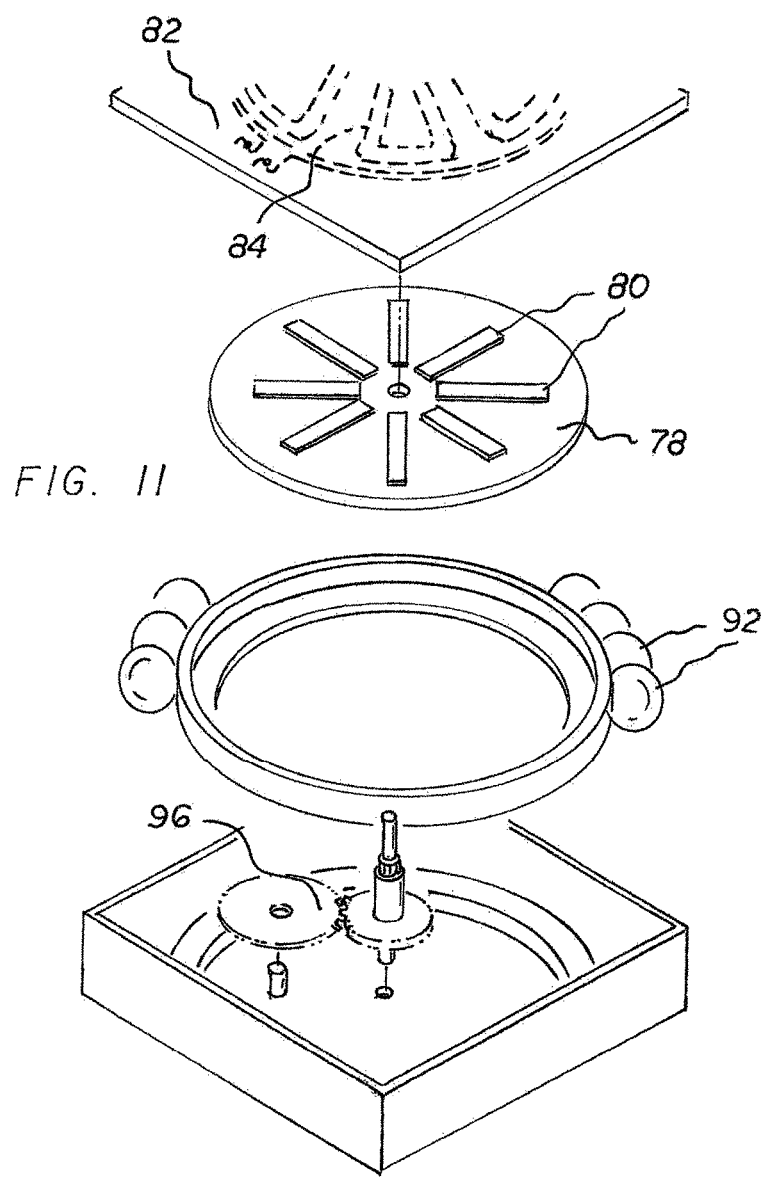
FIG. 11 is an exploded perspective view of one of the two upper turbines.

With reference now to the drawings, and in particular to FIG. 1 thereof, the preferred embodiment of the new and improved turbine vehicle system embodying the principles and concepts of the present invention and generally designated by the reference numeral 10 will be described.

The present invention, the turbine vehicle system 10 is comprised of a plurality of components. In their broadest context such include a vehicle having a plurality of turbines. Each turbine includes a housing with a spindle. Each spindle has a central axis and a rotor with outwardly extending blades. Each turbine also includes a stator positioned adjacent to an associated rotor. Such components are individually configured and correlated with respect to each other so as to attain the desired objective.

In the preferred embodiment, the system is a turbine vehicle system 10 utilizing wind for rotating turbines in a vehicle when moving and for powering the vehicle in response to the rotating. The rotating and powering are done in a safe, energy efficient, economical and ecological manner.

A vehicle body 14 has a forward end 16 and a rearward end 18, an upper portion 20 and a lower portion 22, and laterally spaced first and second sides 24, 26. The body has first and second lower air intake ducts 28, 30 and first and second lower air outlet ducts 32, 34. The body has first and second upper air intake ducts 36, 38 and a common upper air outlet duct 40. Next provided is a forward lower turbine 46 and a rearward lower turbine 48 within the lower portion of the vehicle body. A forward upper turbine 50 and a rearward upper turbine 52 are provided within the upper portion of the vehicle body.

Each turbine includes a housing 56 with a turbine within each housing. Each housing has a generally rectilinear configuration formed of an upper plate 58 and a parallel lower plate 60 separated by a height. Each housing has a forward end 62 and a rectilinear periphery 64.

A vertically oriented spindle 68 is encompassed by upper and lower spindle brackets 69 centrally positioned within each housing and turbine. The spindle has a central axis.

Next provided is a rotor 78, a circular rotatable plate with magnets 80 imbedded in the rotatable plate. In the preferred embodiment, the magnets are shaped in the form of eight rectangles extending radially at 45 degrees with respect to each other. Above and below the rotatable plate are stators 82, a circular fixedly positioned plate with coils of coiled wires 84. Such wires are secured on the fixedly positioned plate adjacent to the rotating magnets. In the preferred embodiment, the wires are shaped in the form of eight isosceles triangles with legs extending radially at 45 degrees. The wires of the triangles are coupled to each other and then extend exteriorly of the turbines to provide electrical current to the system when the magnets are rotated with respect to the wires. This orientation of components presents-a more compressed configuration and thus utilizes less space in the vehicle than prior designs. Alternate configurations could still be utilized in some situations.

The stators and the rotors in the housings form turbines. The lower turbines are part of the undercarriage of the vehicle. The lower turbines are adapted to seal off through sliding doors 86 to form air-tight chambers. Compressed air tanks 88 located in a hood section of the vehicle force compressed air through an inlet nozzle 90 against vanes 92 attached to the rotors located in the air-tight chambers. Control of the compressed air is through compressor 87 and vacuum pump 89. An outlet port laterally spaced from the inlet nozzle allows escape of the compressed air from the lower turbines after rotating the rotor. Once the rotor is turning at a predetermined speed and the vehicle is moving, the sliding doors are open and the flow of air through the housing keeps the rotors rotating and the vehicle powered.

Once the rotors are turning at a predetermined speed, the sliding doors are opened and flows of air through the turbines power the vehicle. These turbines are used to start the vehicle, putting the vehicle in motion, by producing energy to power the vehicle. The lower compressed air driven turbines also provide power when the vehicle is not in motion. The turbines also augment the power produced by external air turbines. The two undercarriage lower turbines counter rotate to off-set centrifugal forces on the vehicle.

The compressed air tanks located in the hood section of the vehicle initiate rotation of the rotors. Such compressed air tanks are equipped with an explosive device as in vehicle air bags. In the case of a front end collision, the tanks collapse and release air and absorb shock.

The two upper turbines are located in the roof of the vehicle and constitute external air turbines. They are structurally similar to the two lower turbine but with the sliding doors removed. The inlet nozzles and exit ports are also removed. The upper turbines are powered by air rushing over the vehicle. The upper turbines counter rotate. The upper turbines are activated after the undercarriage lower turbines have put the vehicle in motion. A gear train 96 is rotated by air turning the vanes to multiply the speed of the rotors. This in turn increases the power output of the turbines. The configuration of the upper turbines is essentially the same as described herein for the lower turbines.

Lastly, an electric motor 94 is provided within the vehicle. The turbines are adapted to power the electric motor and the motor is adapted to drive the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turbine vehicle system (10) utilizing wind for rotating turbines in a vehicle when moving and for powering the vehicle in response to the rotating, the system comprising:
    a vehicle body (14) having a forward end (16) and a rearward end (18), an upper portion (20), a lower portion (22), and laterally spaced first and second sides (24)(26); the body having first and second lower air intake ducts (28)(30) and first and second lower air outlet ducts (32)(34); the body having first and second upper air intake ducts (36)(38) and a common upper air outlet duct (40);
    a forward lower turbine (46) and a rearward lower turbine (48) within the lower portion of the vehicle body, a forward upper turbine (50) and a rearward upper turbine (52) within the upper portion of the vehicle body;
    each turbine including a housing (56) with a turbine within each housing, each housing having a generally rectilinear configuration formed of an upper plate (58) and a parallel lower plate (60) separated by a height, each housing having a forward end (62) and a rectilinear periphery (64);
    a vertically oriented spindle (68), upper and lower spindle brackets (69) encompassing the vertically oriented spindle, the upper and lower brackets centrally positioned within each housing and turbine, the spindle having a central axis; and
    a rotor (78) having a circular rotatable plate with magnets (80) imbedded in the rotatable plate.

2. The system as set forth in claim 1 wherein, the magnets are shaped in the form of eight rectangles extending radially at 45 degrees with respect to each other.

3. The system as set forth in claim 2 and further including stators (82) above and below the rotatable plate, a circular fixedly positioned plate with coils of coiled wires (84), the wires being secured on the fixedly positioned plate adjacent to the rotating magnets.

4. The system as set forth in claim 3, wherein the wires are shaped in the form of eight isosceles triangles with legs extending radially at 45 degrees, the wires of the triangles being coupled to each other and then extending exteriorly of the turbines to provide electrical current to the system when the magnets are rotated with respect to the wires.

5. The system as set forth in claim 3 wherein:
    the stators and the rotors in the housings form upper and lower turbines, the lower turbines being part of the undercarriage of the vehicle, the lower turbines being adapted to seal off through sliding doors (86) to form air-tight chambers, compressed air tanks (88) located in a hood section of the vehicle force compressed air through an inlet nozzle (90) against vanes (92) attached to the rotors located in the air-tight chambers, control of the compressed air being through compressor (87) and vacuum pump (89), an outlet port laterally spaced from the inlet nozzle allowing escape of the compressed air from the lower tubines after rotating the rotor, once the rotor is turning at a predetermined speed and the vehicle is moving, the sliding doors open and the flow of air through the housing keeps the rotors rotating and the vehicle powered.

6. The system as set forth in claim 5 wherein the forward upper turbine and the rearward upper turbine are located in the roof of the vehicle and constitute external air turbines, the upper turbines being powered by air rushing over the vehicle, the upper turbines counter rotating, the upper turbines being activated after the lower turbines have put the vehicle in motion, a gear train (96) to multiply the speed of the rotors.

7. The system as set forth in claim 6 and further including an electric motor (94) within the vehicle, the turbines being adapted to power the electric motor and the motor being adapted to drive the vehicle.

\* \* \* \* \*